Sept. 30, 1941.  R. O. MOORE  2,257,393
AUTOMATIC DIVERTING VALVE
Filed Aug. 25, 1939  2 Sheets-Sheet 1

Ralph O. Moore
INVENTOR

BY Philip A. H. Terrell
ATTORNEY

Sept. 30, 1941. R. O. MOORE 2,257,393
AUTOMATIC DIVERTING VALVE
Filed Aug. 25, 1939 2 Sheets-Sheet 2

Ralph O. Moore
INVENTOR

BY Philip A. H. Sewell
ATTORNEY

Patented Sept. 30, 1941

2,257,393

UNITED STATES PATENT OFFICE 2,257,393

AUTOMATIC DIVERTING VALVE

Ralph O. Moore, Tulsa, Okla.

Application August 25, 1939, Serial No. 291,958

2 Claims. (Cl. 137—68)

The invention relates to automatic diverting valves used in connection with a plurality of storage tanks, fed from a main line, and has for its object to provide spring closed valves in connection with each tank and seated by springs of predetermined tension whereby the tanks may be selectively filled according to the setting of the tensions of the springs.

A further object is to provide float means within the tank for positively seating the valve when the tanks become full, thereby insuring the diverting of the flow of oil to the next set valve.

A further object is to locate the valve in branch lines from the main line so that the flow through the main line will be unobstructed and so the oil will take the line of least resistance for filling the tanks according to the sequence of operation desired.

A further object is to provide each valve with means whereby it can be positively locked in a closed position when desired.

A further object is to provide indicia means on each valve so that the spring tension of each valve may be adjusted differently and according to the sequence in which it is desired to fill the tank.

With the above and other objects in view the invention resides in the combination and arrangement of parts, as hereinafter set forth, shown in the drawings, described and claimed, it being understood that changes in the precise embodiment of the invention may be made within the scope of what is claimed without departing from the spirit of the invention.

Figure 1:
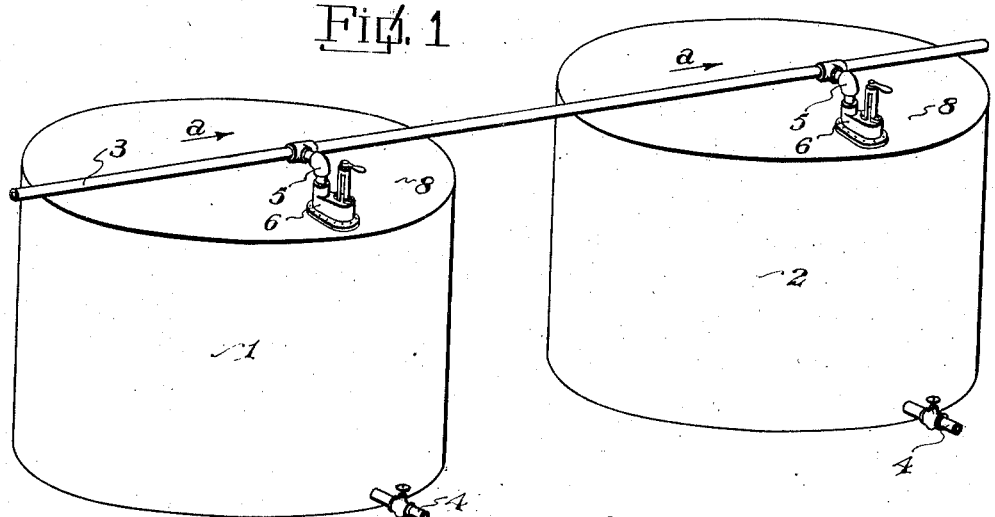
Figure 1 is a perspective view of two storage tanks and a supply line, showing the valves applied thereto.
Figure 2:
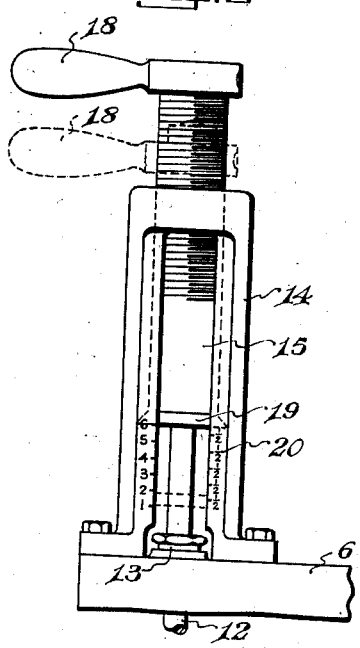
Figure 2 is a side elevation of the valve adjusting mechanism.

Referring to the drawings, the numerals 1 and 2 designate conventional forms of oil storage tanks, into which oil is pumped through a supply line 3. Tanks 1 and 2 are provided with drain lines 4 of conventional construction which may lead to any suitable source of discharge. Although two tanks are shown, it is to be understood any number of tanks may be used.

Oil flows through the supply pipe 3 in the direction of arrows $a$, Figure 1, and it will be obvious that if the tanks are provided with valves set to open at different pressures, the oil will take the course of least resistance and open the low pressure valve first and the other valves in the sequence of their settings, provided means is also provided for positively closing the valves in the order of their sequence of opening at the end of the filling operation of each tank.

The supply pipe 3 is provided with branch lines 5, which are connected to the valve casings 6, bolted at 7 to the tops 8 of the tanks. Each valve casing 6 is provided with a valve seat 9 extending into the tank and with a disc valve 10 normally held seated by means of an expansion spring 11. The valve 10 is provided with an upwardly extending valve stem 12 slidably mounted in a stuffing box 13 in the upper side of the valve casing 6. Stem 12 extends upwardly through a yoke 14 carried by the casing 6 and through a tension adjusting sleeve 15, and has its upper end provided with a collar 16 with which the expansion spring 11 cooperates. The lower end of the expansion spring 11 is seated in the bottom of the adjusting sleeve 15, therefore it will be seen that the tension of the expansion spring 11 may be varied by rotating the threaded sleeve 15, which is threaded at 17 into the upper end of the yoke, and the amount of pressure necessary to unseat the valve 10 may be accordingly varied, thereby allowing a series of valves on a series of tanks to be adjusted to open in any sequence of operation, as the flow of oil will take the line of least resistance and open the valve having the least tension thereon. The sleeve 15 is provided with a handle 18 so it can be easily rotated.

Figure 3:
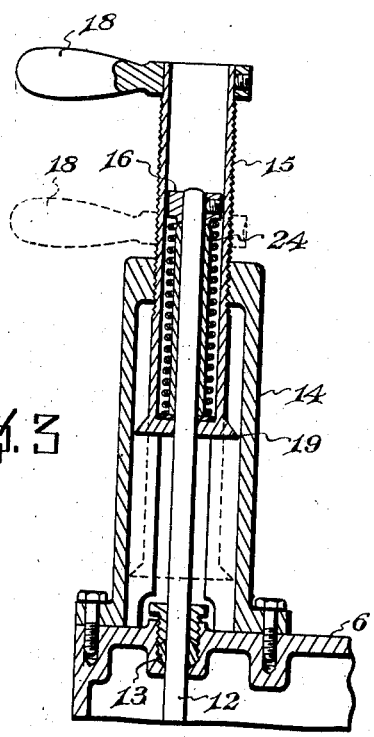
Figure 3 is a vertical longitudinal sectional view through the valve adjusting mechanism.
Figure 4:
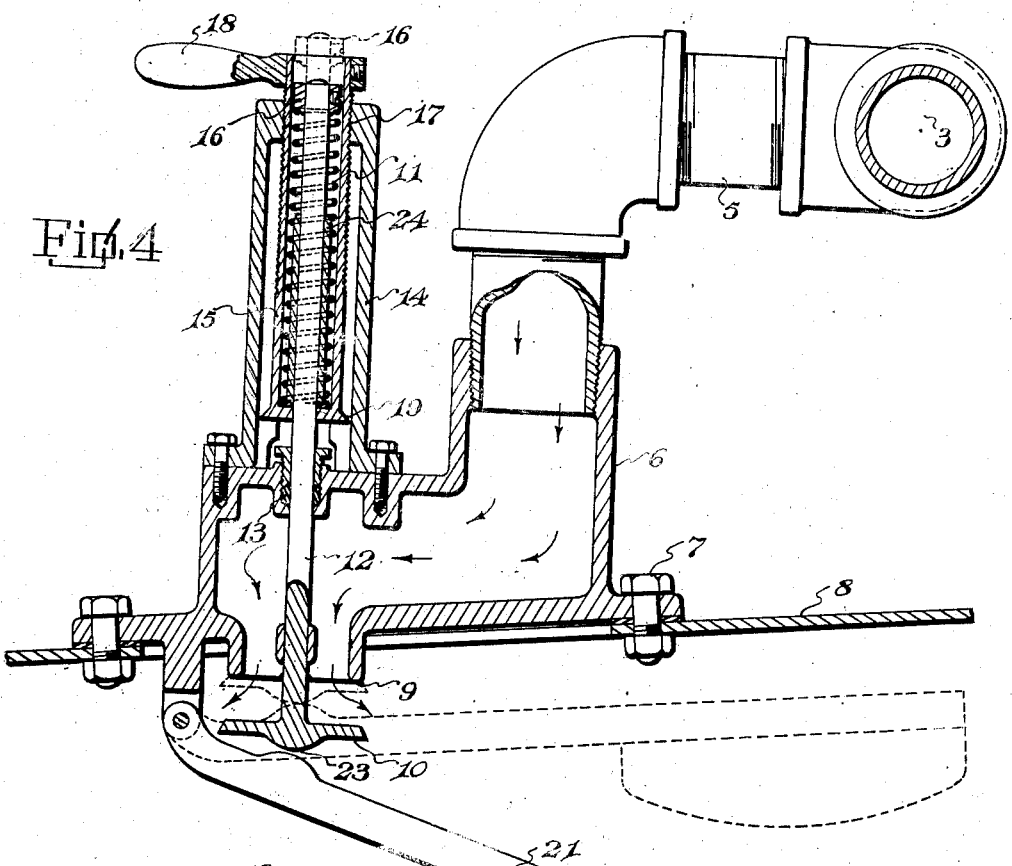
Figure 4 is vertical longitudinal sectional view through the valve, a portion of the tank and the supply line.
Figure 5:
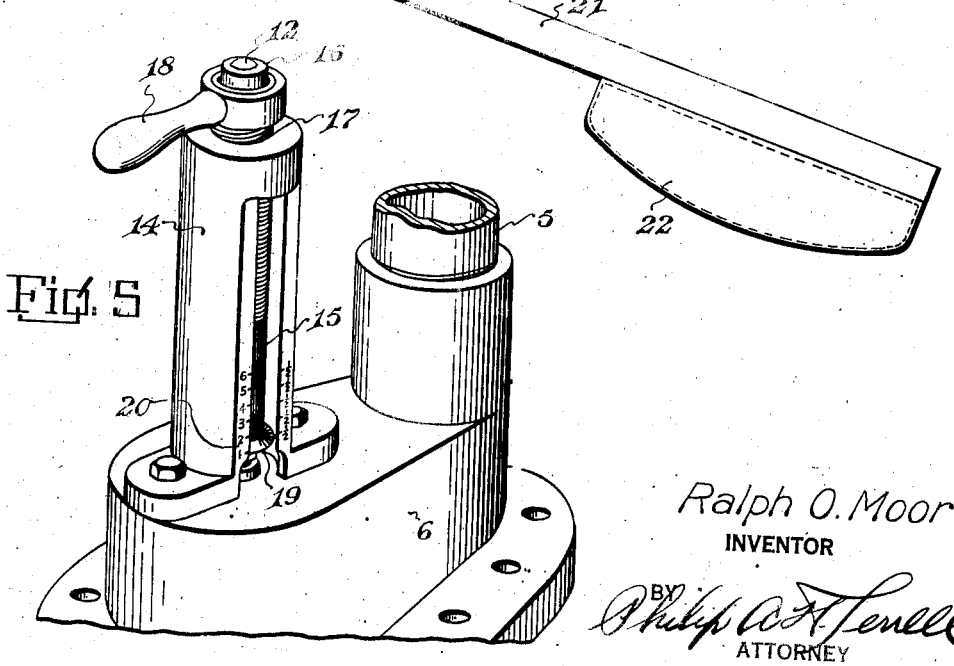
Figure 5 is a perspective view of the valve control mechanism and a portion of the valve casing.

The lower end of each sleeve 15 is provided with a flange 19, which can be easily observed through the open side of the yoke 14 and can be adjusted in relation to the indicia 20 for opening at particular pressures or in a particular sequence of operation. As each tank fills the float arm 21 moves upwardly under the influence of its float 22 and engages the under side of the valve 10 at 23 and positively seats the valve, adding considerable difference of pressure thereto in addition to the spring 11, consequently the oil will open the next valve set in the order of the setting, therefore it will be seen that any number of tanks may be filled in any sequence desired. When it is desired to positively cut off a tank from operation it will only be necessary for the operator to thread outwardly the threaded sleeve 15 until the sleeve 24, surrounding the valve stem 12, jams against the collar 16 and the bottom of the chamber of the sleeve 15, clearly shown in Figure 3, therefore it will be seen that any valve 10 may be positively seated against operation.

From the above it will be seen that a valve is provided which may be incorporated in a tank filling system and the valve of each tank set to selectively open and close in a predetermined sequence of filling operations. It will also be seen that the valves are normally closed and set to open at predetermined pressures for a sequence of operations and that float means is provided in connection with each valve for adding additional seating pressure to each valve when the tank is filled so that the next valve will open according to its setting.

The invention having set forth what is claimed as new and useful is:

1. A valve structure comprising a casing, a valve seat carried by the casing, a valve engaging the seat and normally closed, a valve stem carried by the valve, a yoke carried by the casing on the outside thereof, a sleeve threaded in said yoke and surrounding the valve stem, a collar carried by the valve stem within the sleeve, an expansion spring interposed between the collar and the bottom of the threaded sleeve, means for rotating the threaded sleeve for varying the tension of the spring and a sleeve surrounding the valve stem within the threaded sleeve and forming means whereby the valve may be positively seated when the threaded sleeve is threaded outwardly and the sleeve around the valve stem engages the bottom of the threaded sleeve and the collar.

2. A valve structure comprising a casing, a valve seat carried by the casing, a valve engaging the seat and normally closed, a valve stem carried by the valve, a yoke carried by the casing on the outside thereof, a sleeve threaded in said yoke and surrounding the valve stem, a collar carried by the valve stem within the sleeve, an expansion spring interposed between the collar and the bottom of the threaded sleeve, means for rotating the threaded sleeve for varying the tension of the spring, a tank on which said valve structure is mounted, said valve being disposed within the tank, and a hinged float arm carried by the casing within the tank and extending across the path of the valve and positioned to force said valve to seated position upon upward movement of the free end thereof and a float carried by the free end of said float arm.

RALPH O. MOORE.